UNITED STATES PATENT OFFICE.

CHARLES LENNIG, OF PHILADELPHIA, PENNSYLVANIA.

IMPROVEMENT IN MANUFACTURE OF SAL-AMMONIAC AND SULPHATE OF SODA OR POTASH.

Specification forming part of Letters Patent No. 196,464, dated October 23, 1877; application filed August 17, 1877.

*To all whom it may concern:*

Be it known that I, CHARLES LENNIG, of the city and county of Philadelphia and State of Pennsylvania, have invented or discovered certain new and useful Improvements in Processes of Making Sal-Ammoniac and Sulphate of Soda or Potash; and I do hereby declare the following to be a full, clear, and exact description of the same.

Prior to my invention or discovery a process was known for making the articles of commerce known as sal-ammoniac and sulphate of soda. In that process a charge of a mixture, in proper proportions according to their chemical equivalents, of sulphate of ammonia and muriate of soda was placed in a subliming-vessel, which was subjected to the proper degree of heat. By decomposition ammonia was liberated from the sulphate of ammonia and combined with the muriatic acid of the muriate of soda, forming sal-ammoniac, which was collected upon the concave lid of the subliming-vessel in the form of a cake similar in appearance to camphor, the residue being sulphate of soda. The mixture was thus decomposed at a single operation, the residuum removed, and another charge of the mixture placed in the subliming-vessel, and the process repeated. Great difficulties were met with in carrying out this process, owing to the unequal decomposition of the mixture and consequent loss.

Experience has taught me that at the beginning of the decomposition in this process a portion of the ammonia is set free, escapes, and is lost before the muriatic acid can combine with it, and at the end of the decomposition a portion of the muriatic acid is lost, because it has no ammonia to combine with, it having escaped and been lost at the beginning of the decomposition. Owing to this loss it has been unprofitable to produce sal-ammoniac from these substances, the process being too expensive to carry on.

The object of my invention is to make sal-ammoniac and sulphate of soda or potash from the sulphate of ammonia and muriate of soda or potash without the loss of either ammonia or muriatic acid, and also to produce sal-ammoniac of even grade and density; and my invention consists in the process of making sal-ammoniac and sulphate of soda or potash from a mixture of sulphate of ammonia and muriate of soda or potash wherein the ammonia and muriatic acid may combine continuously without the loss of either, and condense in the form of flaky particles, as will be hereinafter fully described and claimed.

In carrying out my invention I may employ a long furnace, in construction similar to those known in the art as muffled furnaces, used for making sulphate of soda, or any furnace of considerable length having a tile bed, heated from beneath, with an arched reverberatory chamber above the tile bed. The reverberatory chamber of either of these well-known forms of furnaces I connect by suitable flues or passage-ways with a condensing-chamber, the walls of which are made of either stone, brick, lead, or other suitable material. In the furnace I feed continuously a mixture of sulphate of ammonia and muriate of soda or potash, proportioned according to their combining chemical equivalents, the tile bed being, preferably, previously heated to a red heat. Any degree of red heat may be used; but I have found a dull-red cherry heat to work the best. Such heat may range from 300° to 700° centigrade. Decomposition of this mixture then takes place. The ammonia liberated from the sulphate of ammonia and the muriatic acid from the muriate of soda or potash combine continuously, either in the reverberatory chamber of the furnace or in the condensing-chamber connected therewith, or in both, depending upon the variations in the different stages of decomposition, and are condensed in the form of flaky particles in the condensing-chamber. These particles, after a sufficient quantity has been produced, may be collected, dried so as to remove adherent moisture, and the proper shape, such as cakes, blocks, or tablets, and the proper density, given to them by pressure in suitable molds. The residuum or sulphate of soda or potash is continually discharged or withdrawn from the reverberatory chamber of the furnace when the sulphate of ammonia and muriate of soda or potash have been entirely decomposed, the charge of materials being continuously fed in at one end of the furnace and gradually and continuously moved toward the other end, and thence as continuously discharged, the guide to the speed of the process being that the sulphate of soda or potash thus discharged contains no more, or but slight percentage of, ammoniacal salts.

It is obvious that my invention may be carried out in apparatus differing from that just described. Thus, several furnaces may be employed, the reverberatory chambers of all of which being connected with the condensing-chamber. But each of said furnaces would have to be charged at regular periods different from those at which the others are charged, and so adjusted that the unequal decomposition in the one may compensate for that in the other, in which case the entire charge may be put in at once and so discharged when finished.

But I do not herein claim to have invented any apparatus for carrying out my invention, as there are many forms, too well known to practical chemists to require a description herein, in which this principle of operating can be carried out, and I do not, therefore, restrict myself to the form of apparatus described.

By my invention I produce sal-ammoniac and sulphate of soda or potash, all valuable articles of commerce, without any waste of ammonia or muriatic acid, and I also produce the sal-ammoniac of even grade and proper density.

Having thus described my invention, what I claim as new, and desire to secure by Letters Patent, is—

The process of making sal-ammoniac and sulphate of soda or potash by decomposition by heat in a furnace or furnaces from a mixture of sulphate of ammonia and muriate of soda or potash, which is fed substantially as described, in which process the ammonia and muriatic acid may combine continuously without material loss of either, and be condensed in a chamber or chambers in flaky particles, substantially as described.

In testimony whereof I have signed my name to this specification in the presence of two subscribing witnesses.

CHARLES LENNIG.

Witnesses:
 M. B. PHILIPP,
 H. T. MUNSON.